US010984487B2

(12) United States Patent
Smith et al.

(10) Patent No.: US 10,984,487 B2
(45) Date of Patent: *Apr. 20, 2021

(54) SYSTEMS AND METHODS FOR CORRELATING EXPERIMENTAL BIOLOGICAL DATASETS

(71) Applicant: rMark Bio, Inc., Chicago, IL (US)

(72) Inventors: Jason M. Smith, Oak Park, IL (US); Lev Becker, Chicago, IL (US)

(73) Assignee: rMark Bio, Inc., Chicago, IL (US)

( * ) Notice: Subject to any disclaimer, the term of this patent is extended or adjusted under 35 U.S.C. 154(b) by 116 days.

This patent is subject to a terminal disclaimer.

(21) Appl. No.: 15/726,081

(22) Filed: Oct. 5, 2017

(65) Prior Publication Data

US 2018/0040077 A1 Feb. 8, 2018

Related U.S. Application Data

(63) Continuation of application No. 14/306,520, filed on Jun. 17, 2014, now Pat. No. 9,824,405.

(60) Provisional application No. 61/836,041, filed on Jun. 17, 2013.

(51) Int. Cl.
*G06F 16/00* (2019.01)
*G06Q 50/00* (2012.01)

(52) U.S. Cl.
CPC .................................... *G06Q 50/01* (2013.01)

(58) Field of Classification Search
None
See application file for complete search history.

(56) References Cited

U.S. PATENT DOCUMENTS

| | | | | |
|---|---|---|---|---|
| 9,824,405 | B2 | 11/2017 | Smith | |
| 2008/0228768 | A1* | 9/2008 | Kenedy | G16H 50/30 |
| 2011/0087693 | A1 | 4/2011 | Boyce | |
| 2012/0203640 | A1* | 8/2012 | Karmarkar | G06F 1/1686 705/14.66 |
| 2012/0316942 | A1 | 12/2012 | Sheperd | |
| 2013/0023574 | A1 | 1/2013 | Araki | |
| 2014/0095270 | A1 | 4/2014 | Roth | |
| 2014/0108527 | A1* | 4/2014 | Aravanis | G06Q 50/01 709/204 |
| 2014/0372434 | A1 | 12/2014 | Smith | |

* cited by examiner

*Primary Examiner* — Anhtai V Tran
(74) *Attorney, Agent, or Firm* — Fish & Richardson P.C.

(57) ABSTRACT

Technologies are provided for correlating experimental biological datasets. The disclosed technologies may be used for data dependent socialization for life scientists and organizations. Data dependent socialization may be based on statistical correlations between experimental life science data.

18 Claims, 10 Drawing Sheets

SYSTEMS AND METHODS FOR CORRELATING EXPERIMENTAL BIOLOGICAL DATASETS

CROSS REFERENCE TO RELATED APPLICATIONS

This is a continuation which claims priority under 35 U.S.C. § 121 of U.S. patent application Ser. No. 14/306,520, filed Jun. 17, 2014, entitled "System And Method For Determining Social Connections Based On Experimental Life Sciences Data", which is a nonprovisional claiming priority under 35 U.S.C. § 119 of U.S. Provisional Patent Application No. 61/836,041, filed Jun. 17, 2013, entitled "System And Method For Determining Social Connections Based On Experimental Life Sciences Data." The prior applications are incorporated by reference herein.

BACKGROUND

Today, scientists and organizations primarily learn about the research of other scientists after publication in an industry specific journal, patent, conferences, or other publication report. Further, scientists are often focused on their specific field of study and do not have access to, or an understanding of different areas of research. Scientists working in a related field of research, or even a different field, may be developing and performing experiments that may strategically align with research of another scientist or organization. A strategic alignment based on experimental data may promote a mutually beneficial collaboration. The opportunity to collaborate can be very valuable to a scientist or organization. Collaboration can provide access to relevant expertise and insights that are currently lacking within an individual lab and/or organization. Such expertise and insights can accelerate discovery, promote deeper understanding of the research data, and serve as the cornerstone for establishing further financial relationships based on consulting and/or obtaining public or private grant funding.

SUMMARY

The present inventive system and method relates to techniques for correlating experimental biological datasets. Such techniques may be used, for example, in a service provided on one or more computer systems to provide data dependent socialization for life scientists and organizations. Data dependent socialization may be based on, but not limited to, statistical correlations (overlaps) between experimental life science data. The service may provide individuals with an interface for providing experimental data to the system, a visual connection report representing the identified one or more potential connections for collaboration, and a mechanism to communicate with the one or more identified connections. Additional information may be associated with the provided experimental data. Additional information may include, but not be limited to, identifying information about the one or more scientists associated with the experimental data, scientific information relating to the experimental data, or any other related information.

One or more individuals (or entities, scientists, groups, or any other potential users of the service) may access the system. Such parties are referred to herein as "users". A user may also be an administrator for the system. A user may be an owner of biological data associated with or provided to the system.

One or more organizations (or entities, groups or other potential users of the service) may access the system. Such parties are referred to herein as "organizations." Organizations may include, but not be limited to, a university, a pharmaceutical company, a life sciences company, a bioinformatics company, a government organization, or any other public or private organization. An organization may be an owner of biological data associated with or provided to the system.

One or more users or organizations (or entities, or groups) may have identifying information associated with data provided to the system or stored in one or more data repositories associated with the system. Identifying information may include, but not be limited to contact information (i.e. name, address, email, phone, title, lab website) and/or professional information (i.e. research organization, publications, research summary, grant information or other identifying information). The identifying information may be referred to herein as "id metadata."

Additional information associated with data provided to the system or the stored data may include, but not be limited to, information about the data itself, information about the experiments, analysis platform information, information about the organism, or any other information about the biological research that was performed. This additional information may be referred to herein as "experiment metadata."

A data source may be either public or private. Examples of public data sources, include but may not be limited to the NCBI GEO or EBI Pride databases. Examples of private data sources may include, but not be limited to, data owned by an investigator, a university, a pharmaceutical company, or a bioinformatics company. Further, a data source may be an instrument that provides data. Data sources may include one or more biological datasets.

Biological datasets may include, but not be limited to, measurements of one or more biological molecules such as DNA, RNA, proteins, miRNA, metabolites, or any other biological molecules. Biological datasets may be generated using one or more traditional (ELISA, western blot, qRT-PCR) and/or high throughput methods (proteomics, microarray, nextGen sequencing, miRNA arrays). Further, biological datasets may also include one or more subsets of biological molecules, which have been identified by one or more statistical analysis methods. Biological datasets may be stored in any industry standard or proprietary format. Various techniques, their use and their advantages/disadvantages may be well known to those in the art.

In one embodiment, the system may enable a user or organization to provide one or more biological datasets in one or more formats. The user or organization may provide the data through a visual interface, for example a website or computer application. Further, the system may be directly connected to one or more data sources which may include, but not be limited to a public and/or private database or any external system connected through an Application Program Interface (API). Further, if the system is directly connected to an instrument that generates data (i.e. mass spectrometer, microarray scanner, etc.) or other data processing system, the data may be provided to the system automatically, programmatically, or manually. In some instances, data may be obtained through "cores", which represent third party entities within commercial or academic organizations that generate/process biological datasets.

In a preferred embodiment, the system described herein identifies two or more users and/or organizations, based on one or more correlations between their biological datasets.

Described herein, correlations may refer to one or more overlapping biological molecules in two or more biological datasets identified through the use of one or more computational techniques. Such techniques may include, but not limited to, simplistic approaches with little to no statistical rigor, or a highly sophisticated schema dependent upon higher order data analytics and machine learning, described in detail below. The correlation technique used by the system may be dependent on the type of data, the type of analysis being performed, the data provider, or a specific configuration set by a user or organization. The process of identifying two or more users or organizations based on correlations between their respective biological datasets is referred to herein as "data-dependent socialization".

To enable data-dependent socialization, the system may use associated id metadata, experiment metadata or other information. Further, the system may be configured to recommend and facilitate communication between two or more users, two or more organizations, one or more users to one or more organizations, or any other combination thereof. The recommendation of one or more users or organizations, based on data-dependent socialization, is referred to herein as a "collaboration recommendation." Collaboration recommendations may be strictly based on correlations between two or more biological datasets or further based on one or more criteria set by a user, organization, or system.

By utilizing the data-dependent socialization system and methods described herein, users and organizations can collaborate across similar or multiple disciplines. For private companies (i.e. pharmaceutical, biotechnology) this may enable identification of consultants and/or laboratories in academia that can facilitate and optimize R&D efforts, thereby cutting costs and accelerating product development. For academics, the system may serve as a conduit to identify key partnerships with other investigators in the private and public domains that may optimize their research and funding efforts. The system described herein may provide the user or organizations a report containing what data overlaps and why it overlaps. This report may facilitate a mutually "common ground" understanding independent of their specific expertise. Further, the system may suggest one or more areas of additional research (i.e. follow-up experiments), suggest products, provide links to supplier companies that can support the additional research, or suggest new funding opportunities.

Existing social networks require an individual or organization to explicitly provide information and to explicitly interact. This "broadcast" model represents the typical social networking model provided by LinkedIn®, Facebook®, Google+®, and others. Scientifically focused social networks such as ResearchGate®, VIVO®, SciVee®, Mendeley®, ScienceSifter®, and others provide scientists with a similar social network model. These social networks may provide linking recommendations based on evaluation of publications to obtain co-author information and keywords associated with the publication. For example, it may recommend a link between two scientists that have the term "Macrophage" in the title or abstract of their respective publications. This provides limited value to a scientist. For instance, many scientists are already connected to other scientists with similar research interests and they would certainly know co-authors of their publication. These solutions may fail to link scientists that do not have the same keywords or who have not co-authored a publication. Further, these solutions fail to provide a dynamic representation of the current research interests of a scientist or organization.

None of the solutions discussed above evaluate biological datasets to recommend collaborations, facilitate communication, maintain data privacy, or further recommend funding opportunities and products or services to one or more users and/or organizations.

A solution that enables one or more users or organizations to identify one or more potential collaborators based on one or more correlations from one or more biological datasets has eluded those skilled in the art.

A solution that facilitates a connection between two or more users and/or organizations while maintaining privacy relating to their biological data has eluded those skilled in the art.

A solution that recommends one or more funding opportunities to one or more users or organizations based on one or more correlations has eluded those skilled in the art.

A solution that enables one or more organizations to identify cross-disciplinary teams of scientists based on one or more correlations has eluded those skilled in the art.

A solution that enables one or more organizations to target funding to one or more users based on one or more correlations has eluded those skilled in the art.

A solution that recommends one or more experiments or other actionable tasks to one or more users or organizations based on one or more correlations has eluded those skilled in the art.

A solution that recommends one or more products or services to one or more users and/or organizations based on one or more correlations has eluded those skilled in the art.

It would be advantageous to provide a service that identifies potential collaborators based on one or more correlations between one or more biological datasets.

It would also be advantageous to provide a service that, based on one or more correlations, facilitates communication while maintaining privacy between potential collaborators.

It would also be advantageous to provide a service that, based on one or more correlations, identifies funding opportunities to one or more users or organizations.

It would also be advantageous to provide a service that, based on one or more correlations, enables one or more organizations to identify cross-discipline teams of scientists.

It would also be advantageous to provide a service that, based on one or more correlations, enables one or more organizations to target funding to one or more users.

It would also be advantageous to provide a service that, based on one or more correlations, recommends one or more experiments or actionable tasks to one or more users or organizations.

It would also be advantageous to provide a service that, based on one or more correlations, recommends one or more products or services to one or more users or organizations.

DETAILED DESCRIPTION

System

Figure 1:
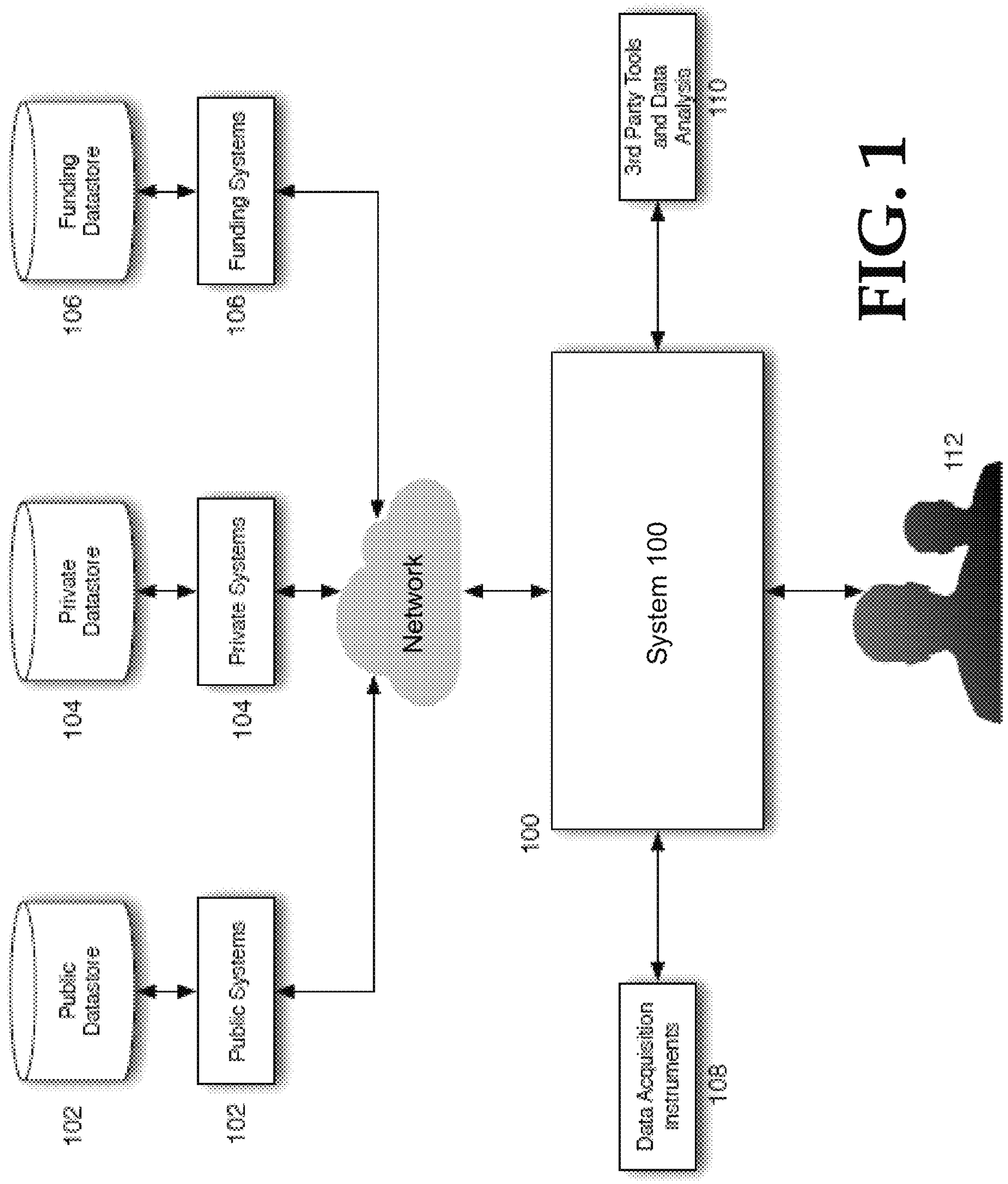
FIG. 1 is a block diagram illustrating an example system and its connections with one or more other systems.

FIG. 1 is an illustration of one embodiment of the system and its connections with one or more other systems. The system 100 may be connected via either a public or private network and may have a connection to one or more systems with one or more associated data stores. Examples include, but are not limited to, public, private, funding or other systems and data stores as illustrated by a Public Datastore 102, a Private Datastore 104, and a Funding Datastore 106. They may be connected to system 100 via the internet, an Application Program Interface (API), or other system interface. Public system 102 may include, but not be limited to, a government organization, a university, or other publicly available system. Private system 104 may include, but not be limited to, a pharmaceutical company, a biotechnology company, a university, or other private organization. Funding system 106 may include, but not be limited to, a public or private funding system containing information relating to one or more funding opportunities (i.e. grants).

The system may be configured to integrate directly with one or more instruments that acquire data at Data Acquisition Instruments 108. Such instruments may include, but not be limited to, a mass spectrometer, a microarray scanner, or any other instruments.

The system may be configured to interface directly with one or more third party analysis tools or curated repositories illustrated as 3rd Party Tools and Data Anaylsis 110. Examples include, but are not limited to, Synapse® from SAGE®, Ingenuity®, and NextBio®. These services have aggregated data from public data stores, private data stores, or both and have applied one or more algorithms to index and quantify the data.

The system may provide an interface for one or more users or organizations 112 to access, provide data, receive and view recommendations for collaborations, funding opportunities, products and/or service, communicate with one or more collaborators, and interact with the system. The interface may be provided via a web page, computer application, a combination thereof, or any other device-dependent interface.

Figure 2:
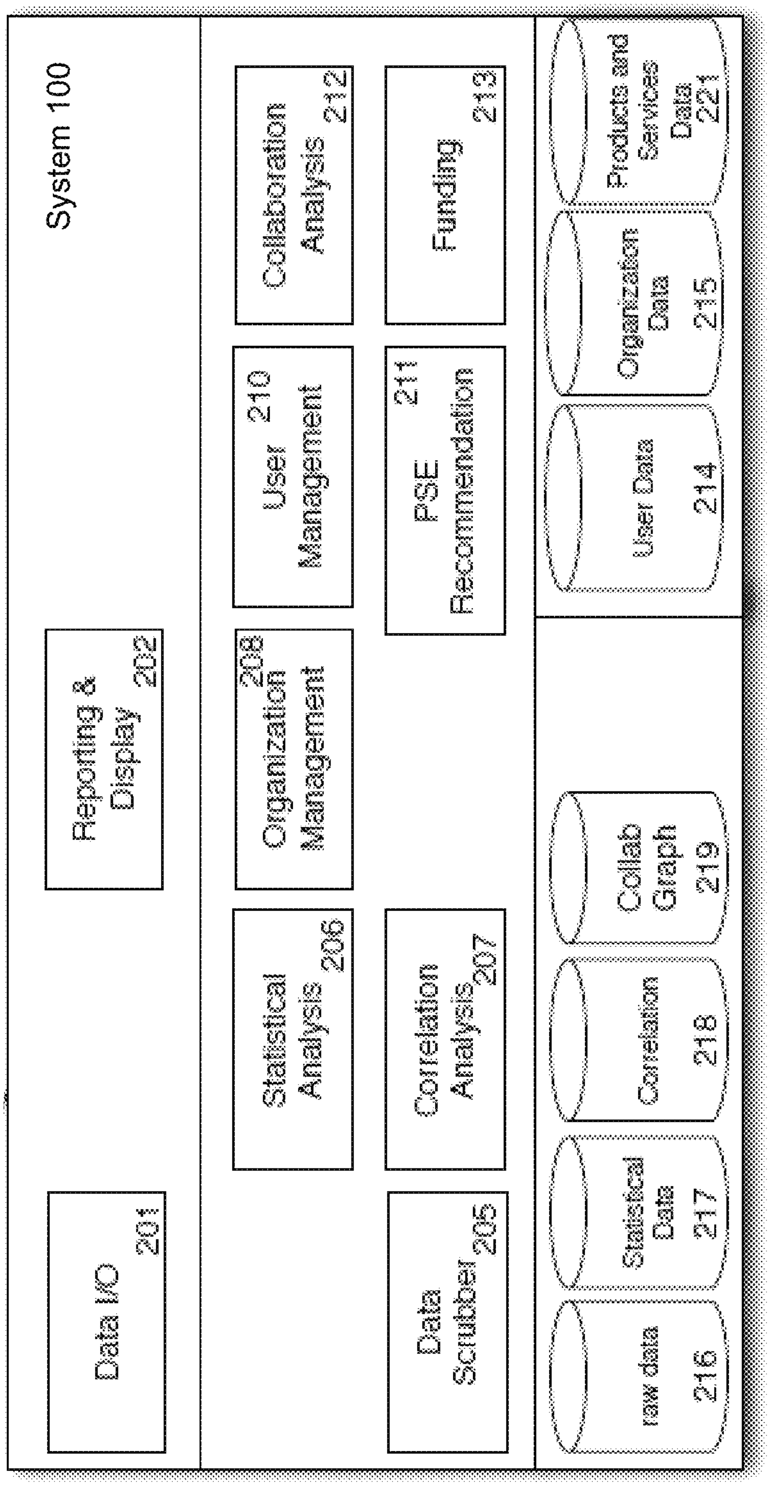
FIG. 2 is a block diagram illustrating one embodiment of the system and its components.

FIG. 2 is an illustration of the components that comprise one embodiment of the system described in detail below. Unless indicated otherwise, the functions described herein may be performed in hardware, software, firmware, or some combination thereof. In some embodiments, the functions may be performed by a processor, such as a computer or an electronic data processor, in accordance with code, such as computer program code, software, and/or integrated circuits that are coded to perform such functions. Those skilled in the art will recognize that software, including computer-executable instructions, for implementing the functionalities of the present invention may be stored on a variety of computer-readable media including hard drives, compact disks, digital video disks, computer servers, integrated memory storage devices and the like.

Any combination of data storage devices, including without limitation computer servers, using any combination of programming languages and operating systems that support network connections, is contemplated for use in the present inventive method and system. The inventive method and system are also contemplated for use with any communication network, and with any method or technology, which may be used to communicate with said network.

In the illustrated embodiment, the components of system 100 are resident on a computer server; however, those components may be located on one or more computer servers, specific components may be located on separate system, one or more user devices (such as one or more smart phones, laptops, tablet computers, and the like), any other hardware, software, and/or firmware, or any combination thereof.

Components of system 100 may include, but need not be limited to, the following: a data input and output component 201, a reporting and display component 202, a data scrubber component 205, a statistical analysis component 206, a correlation analysis component 207, an organization management component 208, a user management component 210, a Product, Services and Experiment (PSE) recommendation component 211, a collaboration analysis component 212, and a funding component 213. The illustrated components may interact with one or more databases 214, 215 216, 217, 218, 219, 221.

The data input and output component 201 may be configured to receive data from or send data to one or more sources, as described in FIG. 1. The data input and output component 201 may be configured to provide data to or receive data from one or more components within the system 100. The data input and output component 201 may interface with one or more other components or databases of the system 100.

The reporting and display component 202 may be configured to report one or more recommended collaborators, funding opportunities, follow-up research, products and services to one or more users or organizations. Such report may be accessible via a web page, application, or email. Further, the report may be configurable based on one or more privacy settings.

The data scrubber component 205 may be configured to analyze the quality of the data received or stored in the system 100 from one or more sources as described in FIG. 1. The quality control tests may be configured by a user, organization, or system administrator. Further, the quality control tests or quality metrics may be based on the type and/or format of the data. Quality control may remove data determined to be of poor quality based on, but not limited to, number of replications, poor statistical value, experimental setup, and image analysis. The data scrubber component 205 may interface with one or more other components of the system 100. The data scrubber component 205 may be configured to store the data from the quality analysis to a raw data database 216.

The statistical analysis component 206 may be configured to implement one or more statistical techniques to analyze one or more biological datasets. The resulting output from such analysis may include, but not be limited to, identification of a molecule set, gene set, production of a rank ordered list, a molecular network, or any output based on the statistical technique. The statistical technique may be configured by a user, an organization, or the system. The statistical analysis component may be further configured to store the output in a statistical data database 217.

Figure 3:
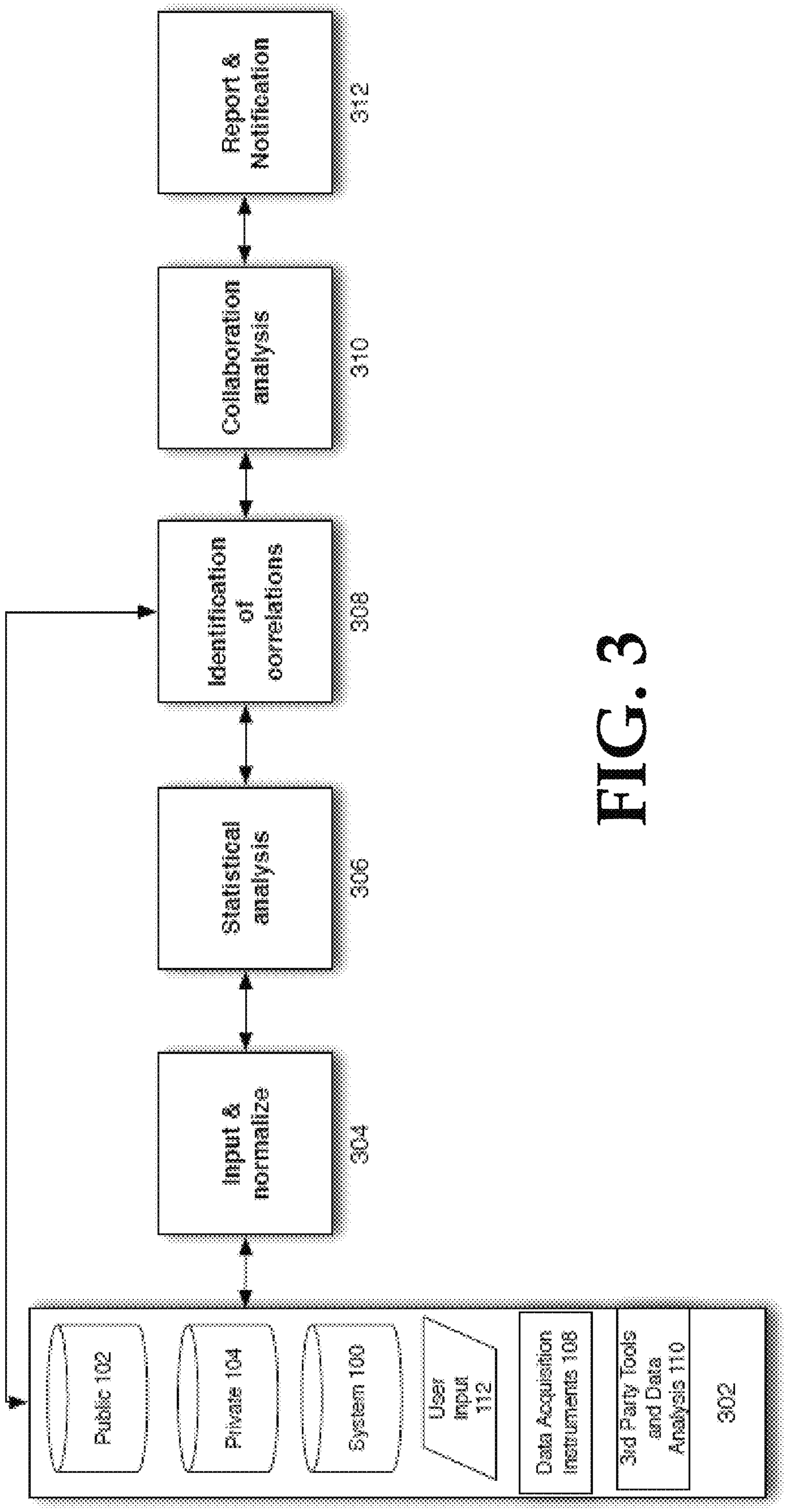
FIG. 3 is a flow diagram illustrating an example process for producing one or more collaboration recommendations.

The correlation analysis component 207 may be configured to use one or more statistical techniques, as described in FIG. 3, to quantify the degree of overlap between two or more biological datasets. The resulting output from such analysis may include, but not be limited to, one or more overlapping biological molecules that were significantly regulated in two or more biological datasets. The statistical technique may be configured by a user, an organization, or the system 100. The correlation analysis component 207 may be further configured to store the output in a correlation database 218.

The organization management component 208 may be configured to store information relating to one or more organizations. The organization information may include, but need not be limited to, funding opportunities, research interest, current projects, or other organization related information. Further, the organization management component 208 may manage one or more users and connect directly with the user management component 210, described below. The organization management component 208 may interface with one or more other components or databases of the system 100 and may be configured to store information in an organization data database 215.

The user management component 210 may be configured to receive and store information relating to one or more users. The information may include, but not be limited to, contact information, email, password, privacy settings relating to their personal information, or any other user identification information. Further, the user management component 210 may receive and store references to biological datasets provided by the user, identification (ID) metadata, experimental metadata, career information or publications. Even further, the user management component 210 may be configured to receive and store privacy information relating to one or more biological datasets provided by the user. The user management component 210 may interface with one or more other components or databases of the system 100 and may be configured to store information in a user data database 214.

The PSE recommendation component 211 may be configured to determine and display one or more recommendations for one or more products, services, research tasks, or other offerings. Recommendations may be specific to the correlated biological datasets. The recommendations may be further tailored based on one or more attributes of the users or organizations. Further, the recommendation component 211 may be configured to recommend research topics, follow-up experiments, or other research related tasks. The recommendation component 211 may interface with one or more other components or databases of the system 100 and may be further configured to store information in a products and services data database 221.

The collaboration analysis component 212 may be configured to determine and provide one or more users and/or organizations with one or more candidate collaborators based on one or more provided metrics. Such metrics may include, but not be limited to, the strength of correlation between biological datasets, the research interests, funding opportunities, methodological expertise, or any other attribute provided by the user, organization or the system 100. The collaboration analysis component 212 may be further configured to notify each user or organization of a potential collaboration. Further, the collaboration analysis component 212 may be configured to provide data to the reporting and display component 202. The collaboration analysis component 212 may be configured to factor in privacy settings of the user, organization, or the biological dataset. The collaboration analysis component may interface with one or more other components or databases of the system 100 and may be further configured to store collaboration information in a collaboration graph database 219.

The funding component 213 may be configured to identify and provide one or more funding opportunities to the one or more users and/or organizations identified by the collaboration analysis component 212. The funding opportunities may be provided by one or more funding sources as described above. The funding component 213 may be configured to provide information relating to the type of funding, the requirements for funding, contact information, amounts, or any other relevant information relating to the funding opportunity. The information relating to the funding opportunity may be directly provided by the funding source or obtained via analysis of metadata and attributes associated with the funding opportunity. Further, the funding component 213 may be configured to identify and provide collaboration, correlation, or any other information stored by a process of the system 100, to a funding source.

As described above, one or more databases 214, 215 216, 217, 218, 219, 221 may be associated with the system 100. The databases may be a flat-file database, SQL database, NoSQL database, or any other data storage system. The databases may be separate based on the type of data being stored or combined into a same database.

One or more of the components illustrated in FIG. 2 may be combined into a single or other multiple components within the system 100.

Data Analysis

FIG. 3 is a flow chart detailing one embodiment of a process for producing one or more collaboration recommendations. The process may be performed by a system 100 such as illustrated in FIG. 2. The process illustrated by blocks may be performed sequentially, concurrently, or re-arranged as convenient to suit particular embodiments. It will also be appreciated that in some examples, various blocks may be eliminated, divided into one or more additional blocks, and/or combined with other blocks.

The process may begin when the system 100 loads one or more biological datasets stored in one or more public, private or system databases 302 or one or more biological datasets are provided by a user, organization, tool, or instrument. Next, the data may be analyzed for quality control and normalized 304. Data that does not pass quality control metrics may be removed from the system 100 and the process may end. The normalization may check the format of the data input and may modify the data format prior to storage. The system 100 may notify the source, user, or organization that provided the data of an issue with the quality of the data. Normalized biological datasets may be stored in a database for future processing. Next, the process may perform statistical analysis on each biological dataset to identify one or more sets of differentially expressed or modified molecules, ordered lists, or any output based on the configured statistical technique 306. Biological datasets that have been subjected to statistical analysis by external systems may also be obtained directly from one or more sources 302. Next, the system 100 may identify one or more correlations between two or more processed biological datasets 308.

One or more correlation analysis techniques are currently available for identifying overlaps of differentially expressed or differentially modified biological molecules (genes, proteins, miRNA, metabolites, etc.). Such examples include, but are not limited to:

Traditional strategies: For each biological dataset, molecules can be ordered in a ranked list L (ie. L1, L2, . . . , Ln.), according to any suitable statistical or quantity metric that represents their differential expression/modification between two biological states. Applying a significance threshold to the top and bottom of each ranked list identifies differentially expressed/modified sets of molecules S that are significantly up-regulated (ie. S1_up, S2_up, . . . , Sn_up.) and down-regulated (ie. S1_down, S2_down, . . . , Sn_down) respectively. Molecular overlaps may be produced by manually comparing differentially expressed/modified sets of molecules across multiple biological datasets (eg. S1_up vs. S2_up, S1_down vs. S2_down, S1_up vs. S2_down, etc.).

Figure 8:
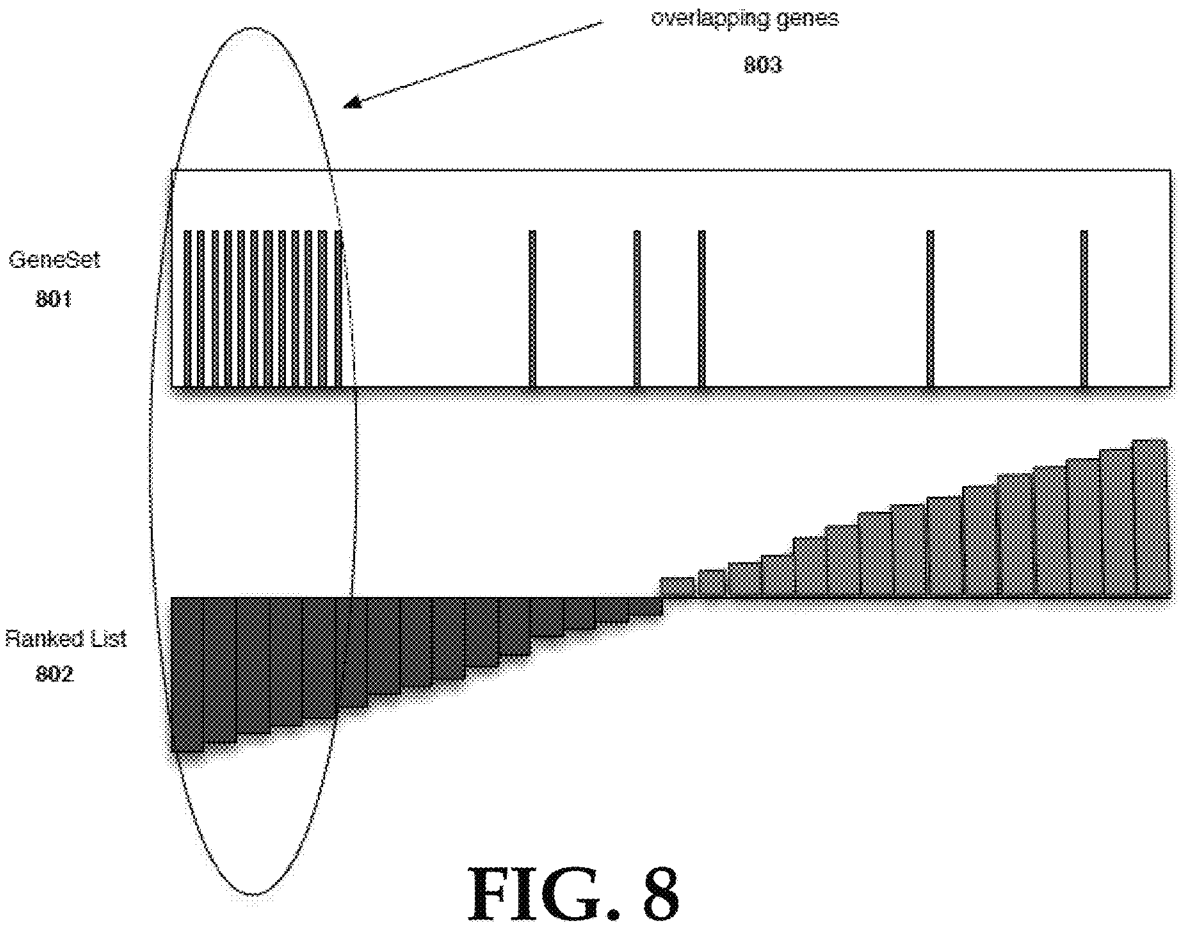
FIG. 8 is a block diagram illustrating one embodiment of comparing a gene set to a ranked list.

Gene set enrichment analysis (GSEA): GSEA is a computational method that determines whether an a priori defined set of genes shows statistically significant, concordant differences in two biological states. It aims to determine whether members of a set of differentially expressed/modified genes (eg. S1_up) in one experiment tend to distribute toward the top (or bottom) of a ranked list in a second experiment (eg. L2). FIG. 8 is an illustration of one embodiment of an overlap between a gene set or ranked list generated by GSEA analysis. Thus, GSEA differs from traditional approaches, as described above, in that it determines overlaps between biological datasets by comparing sets to lists rather than sets to sets. To evaluate the statistical significance of a given overlap, GSEA implements three key components. First, it may use a weighted Kolmogorov-Smirnov-like statistic to calculate an enrichment score (ES) that quantifies the degree to which a set S is overrepresented at the extremes of a list L. Second, it estimates the statistical significance of the ES (nominal P value) by implementing an empirical phenotype-based permutation method. Third, when multiple sets are simultaneously compared to a list, the significance level for each overlap is adjusted for multiple hypothesis testing by normalizing for false-discovery rate. A modified version of GSEA that incorporates a "maxmean" statistic in an effort to more accurately assess the significance of a given overlap is known as Gene Set Analysis (GSA). Although originally intended for use with genes measured in microarray and genome-wide association studies, GSEA (and GSA) may be applicable to data obtained from other technologies.

Molecular networks: There are a wide array of "network-based" approaches that leverage multiple biological datasets to construct molecular networks based on protein interaction networks, transcriptional networks, probabilistic causal networks, etc. While statistical strategies for the above are highly application-specific, the approaches share a common goal—namely, the integration of information from multiple biological datasets to infer relationships between biological molecules at the physical, causal, or transcriptional, etc. levels. Collectively, these methodologies offer the potential to produce higher order overlaps (i.e. overlaps between more than 2 biological datasets) and consolidate this information within the framework of a complex molecular signature or network.

Next, the process may perform collaboration analysis 310 to identify one or more potential collaborators based on one or more identified correlations. The collaboration process may provide a user or organization with potential collaborators based on the strength of the correlation between their respective biological datasets. Further, the recommended collaborators may be weighted on one or more factors, described in detail below.

Next, the reporting and notification 312 process may generate and display a collaboration graph and/or generate and display a collaboration report to one or more users and/or organizations. Further, the process may notify each user or organization of a potential collaboration.

In a further embodiment, the process may facilitate communication between potential collaborators.

In a further embodiment, the reporting and notification step may provide one or more recommendations, including but not limited to, financial opportunities, products or services, or follow-up experiments to one or more notified users or organizations.

Figure 4:
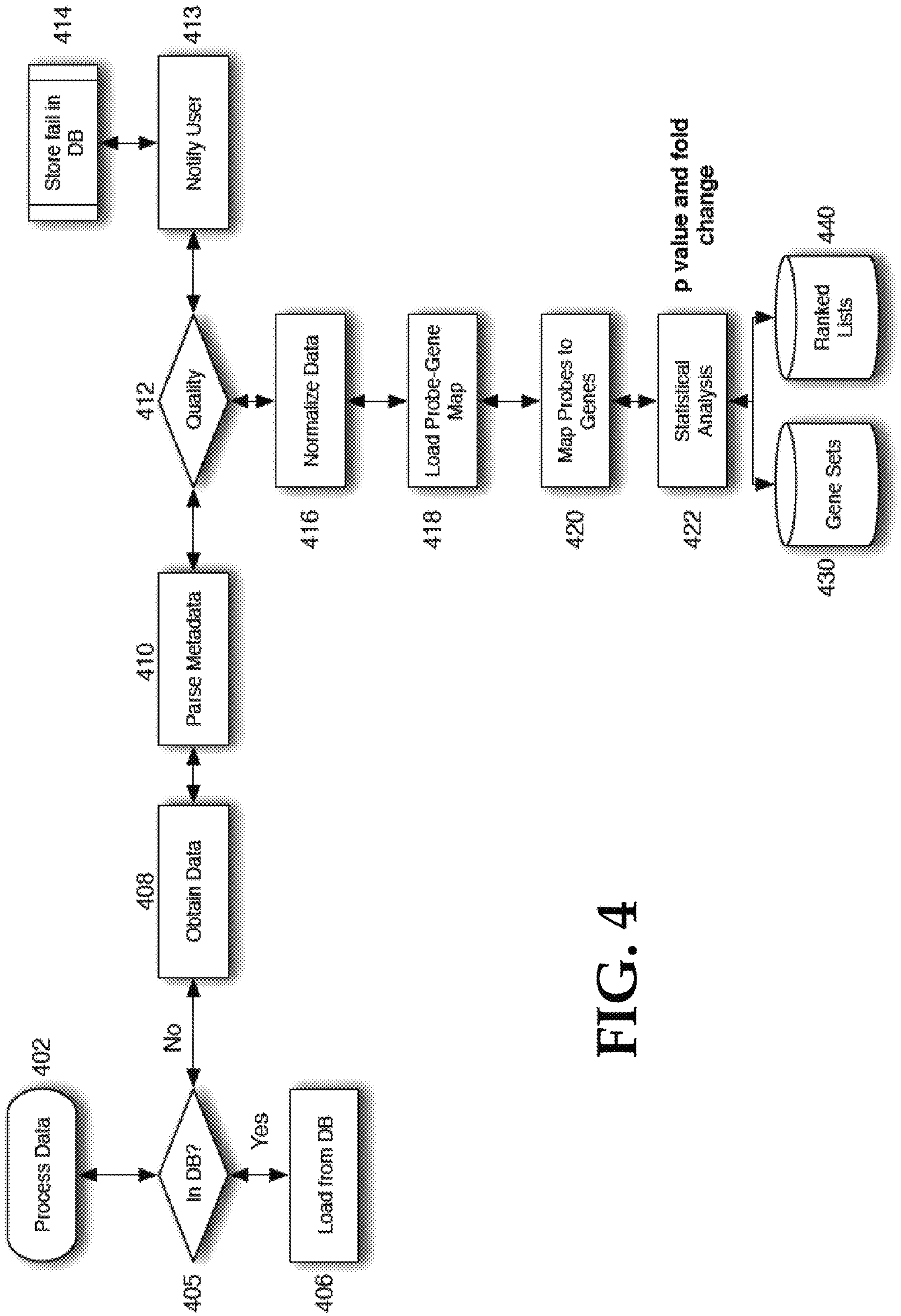
FIG. 4 is a flow chart detailing one embodiment of a process for generating one or more gene sets and ranked lists based on mRNA measurement data from a micro-array analysis.

FIG. 4 is a flow chart detailing one embodiment of a process for generating one or more gene sets and ranked lists based off mRNA measurements from a microarray analysis. The process illustrated by blocks may be performed sequentially, concurrently, or re-arranged as convenient to suit particular embodiments. It will also be appreciated that in some examples, various blocks may be eliminated, divided into one or more additional blocks, and/or combined with other blocks.

The process begins with a Process Data 402 request to process a biological dataset provided by any one of the sources previously described. If the process is obtaining the biological datasets from an external data source, the process may first check to see if the biological dataset is already in a local system database 405. If the biological dataset is already stored in a system database, and is confirmed to be the same version, then it does not require re-downloading 406. If the biological dataset is not locally accessible or up-to-date, then the process may download the biological dataset 408. In one embodiment, the system may utilize one or more existing applications configured to access and download biological datasets from a public data source. Such examples include but are not limited to GeoQuery, NCBI python, or others. Once the biological datasets are downloaded, they may be stored in the system. Further, the biological dataset may be provided directly from a user or organization. Next, the process may receive or extract id metadata or experiment metadata and store the metadata for future processing 410.

Next, if required, the process may check the quality of the data 412. For example, quality control may utilize image analysis to perform quality analysis thereby evaluating any abnormalities that interfere with detecting real differences in signal intensities in microarray experiments. If a biological dataset fails the quality control the user may be notified 413 and provided with a reason why. The process may store a biological dataset identifier and the reason it failed in Store Fail in DB 414. Biological datasets that satisfy quality control metrics may further be normalized 416 to adjust microarray data for effects that arise from variation in the technology rather than from biological differences between the RNA samples. In a further embodiment, data may be provided that has already been analyzed through one or more quality control metrics. In this case, the quality control step may be skipped.

Next, if required, the process may load probe maps 418 and convert probes identifications to genes 420. Because each microarray platform (eg. Agilent®, Affymetrix®) has specific requirements and software packages developed for assessing quality, performing normalization, and converting probes to genes, such processes may be 'tailored' specifically to each platform using publicly available software packages. For example, for Affimetrix platforms software packages may include but not be limited to apt-probest-summarize, affy, affyExpress, affyQCReport, affyILM, affyio, a4, a4Base, a4Classif, or other software packages.

Figure 5:
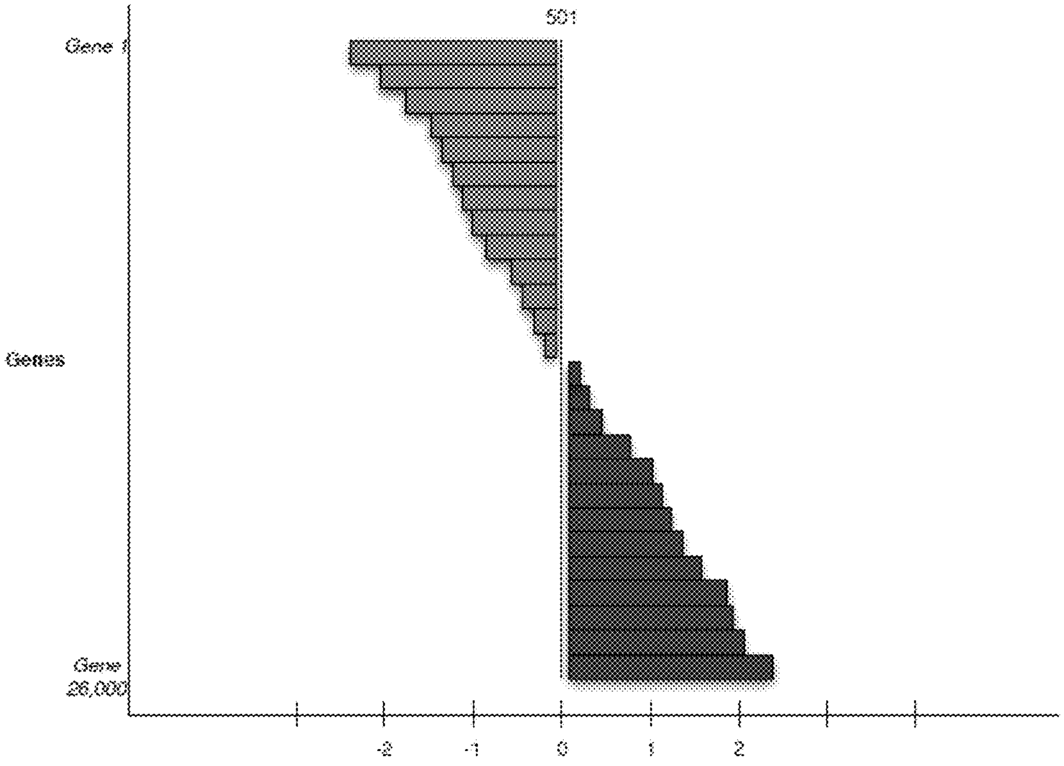
FIG. 5 is a block diagram illustrating one embodiment of a ranked list of genes.
Figure 6:
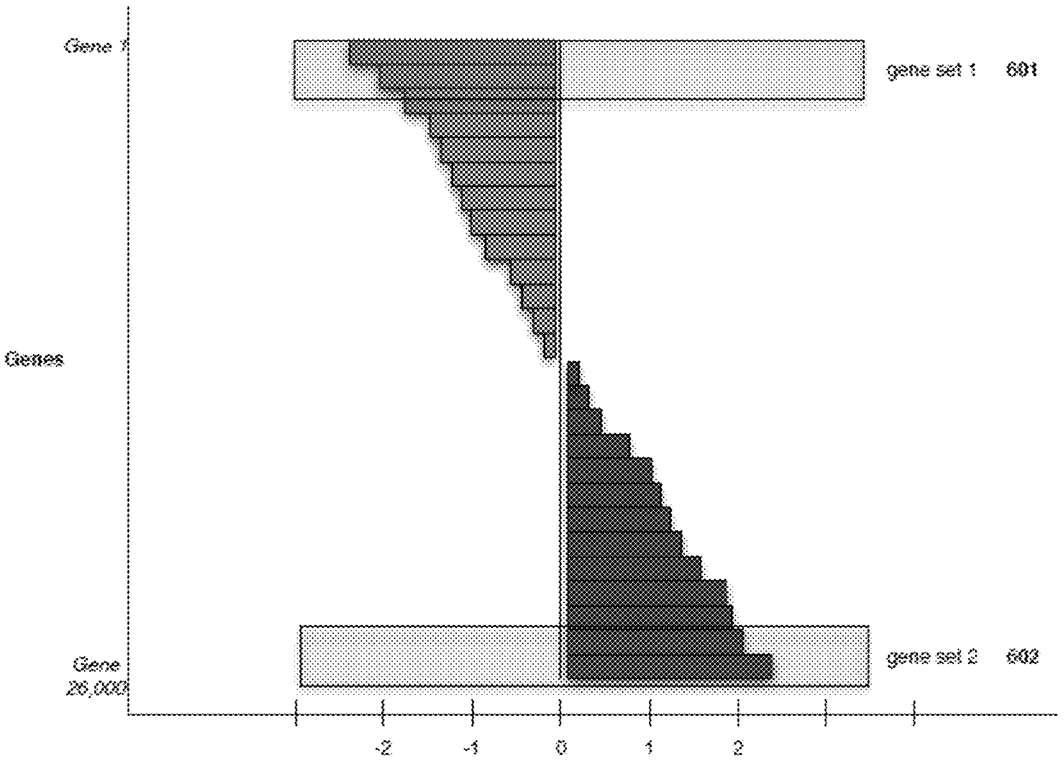
FIG. 6 is a block diagram illustrating one embodiment of a two gene sets identified from a ranked list.

Next, the process may perform statistical analysis 422. For each pairwise comparison within each biological dataset, genes may be ordered in a ranked list 501, see FIG. 5, L (i.e. L1, L2, . . . , Ln.), according to any configured statistic or quantity metric that represents their differential expression or modification between two biological states. Applying a significance threshold to the top and bottom of each ranked list identifies differentially expressed/modified gene sets S that are significantly up-regulated (ie. S1_up, S2_up, . . . , Sn_up.) 602 and down-regulated (i.e. S1_down, S2_down, . . . , Sn_down) 601 respectively, see FIG. 6 comprising an illustration of one embodiment of two gene sets identified from a ranked list.

Because expression levels of some genes may be measured by multiple probe sets, the process may combine information from multiple probes to obtain a single measurement for each gene. The system may generate such ranked lists and gene sets for pairwise comparisons within each biological dataset, or for each biological dataset within the database. In some embodiments, the process may create ranked lists and apply significance thresholds based on differences in magnitude (eg. log fold-change) and/or reproducibility (eg. Bayesian t-test).

In a preferred embodiment, the one or more biological datasets that may include the one or more gene sets or ranked lists may be provided directly from one or more data sources described above. In this embodiment, the system may compare the provided data to the previously processed biological datasets stored in a database associated with the system. For example, a pharmaceutical company may provide a gene set that is of particular relevance to understanding the mechanism and/or side-effects of a new drug in the discovery pipeline. The system may compare the provided gene set against ranked lists in the system to identify one or more correlations.

Figure 7:
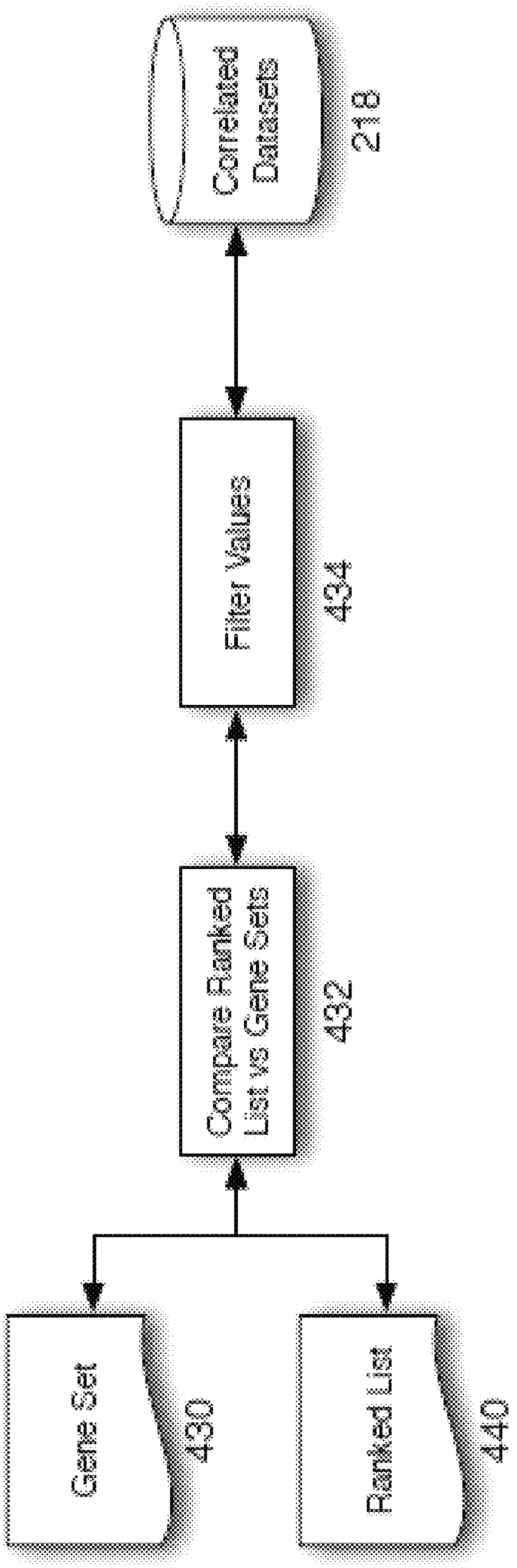
FIG. 7 is a flow diagram illustrating an example process for identifying correlated dataset based on a comparison between one or more ranked lists and one or more gene sets.

FIG. 7 is a flow chart detailing one embodiment of a process for identifying correlated biological datasets based on a comparison between one or more ranked lists and one or more gene sets. The process illustrated by blocks may be performed sequentially, concurrently, or re-arranged as convenient to suit particular embodiments. It will also be appreciated that in some examples, various blocks may be eliminated, divided into one or more additional blocks, and/or combined with other blocks.

The process may identify significant overlaps in gene regulation across biological datasets. In some embodiments, gene set analysis (GSA) may be performed to determine whether members of a gene set (eg. S1_up) 430 in one biological dataset tend to distribute toward the top (or bottom) of a ranked list 440 in a second biological dataset (eg. L2). To assess the significance of a given overlap, the system incorporates a maxmean statistic 432. When multiple gene sets are simultaneously compared to a ranked list, the significance level for each overlap is adjusted for multiple hypothesis testing by normalizing for false-discovery rate. Such an approach produces a Q-value, a metric that estimates the strength of association between a gene set and a ranked list (low Q-value=strong association), for each gene set compared to each ranked list. The process may also filter the Q-values based on one or more criteria set by a user, organization, or the system 434. When a Q-value is lower than an applied significance threshold, the process further outputs genes that are most correlated between that gene set and ranked list and stores them in a database 218.

In a some embodiments, two or more gene sets or ranked lists may be provided for analysis.

FIG. 8 is a block diagram illustrating an example comparison of a gene set 801 and a ranked list 802. The oval highlights an example identification 803 of gene overlaps between the gene set and ranked list.

Collaboration

In some embodiments, the system 100 may be configured to utilize one or more identified correlations to determine and provide one or more users and/or organizations with one or more candidate collaborators based on one or more provided metrics. Such metrics may include, but need not be limited to, the strength of correlation between biological datasets, the research interest, funding opportunities, methodological expertise, or any other attribute provided by the user, organization, or the system 100. The collaboration analysis may further notify each user or organization of a potential collaboration. Further, the collaboration analysis may provide data for reporting to a user or organization.

Figure 9:
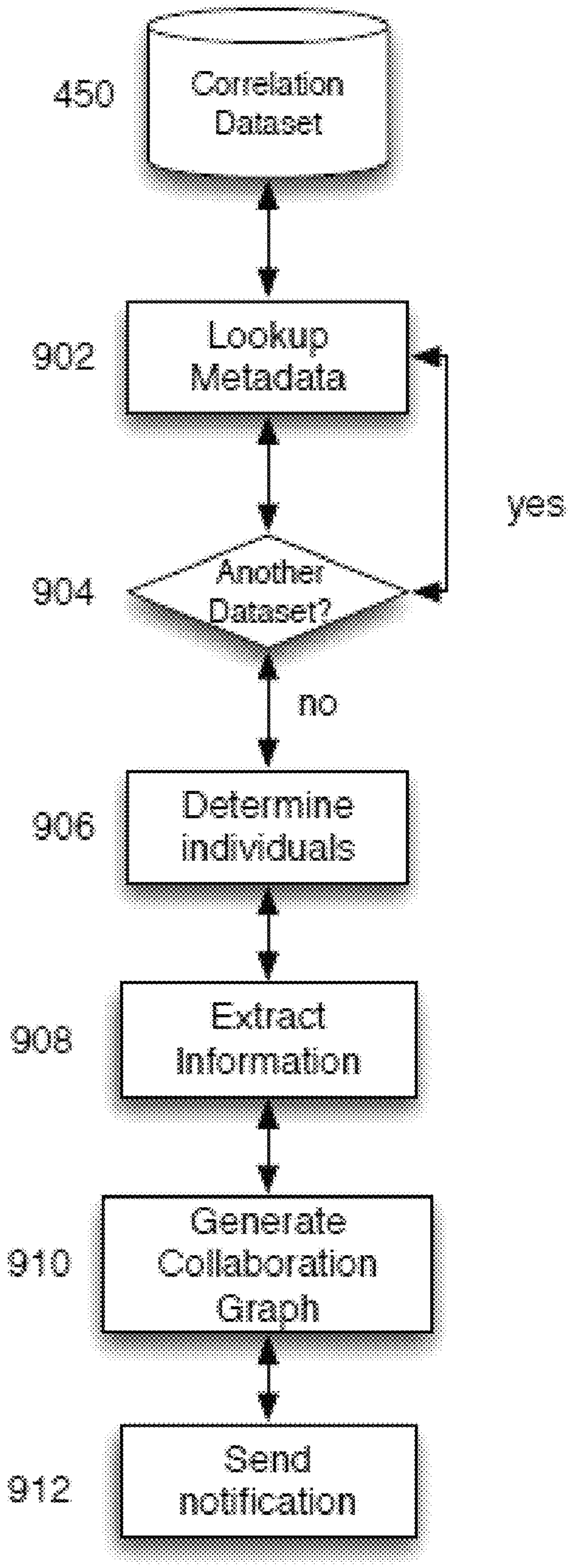
FIG. 9 is a flow diagram illustrating an example process for providing one or more collaboration recommendations.

FIG. 9 is a flow chart detailing one embodiment of a process for providing one or more collaboration recommendations. The process illustrated by blocks may be performed sequentially, concurrently, or re-arranged as convenient to suit particular embodiments. It will also be appreciated that in some examples, various blocks may be eliminated, divided into one or more additional blocks, and/or combined with other blocks.

The process begins when one or more of the processes described above identified a statistically significant overlap (correlation) between two biological datasets and further may have stored the result in the correlation database 450. Next, the process may look up any available ID metadata, experiment metadata, or any other information associated with the correlated biological datasets 902. The process may continue to identify additional correlated biological datasets 904 and associated information until correlations that meet a statistical threshold have been included. Statistical thresholds may be configured by the system 100, a user, or an organization.

Next, the process may utilize the information with the metadata to determine one or more primary scientist(s) or organizations 906. Such information may be determined from information obtained from the publication of the data or the direct input from a user or organization to the system 100. In the case where the contributing scientists are determined from a publication, the system 100 may rely on the first author, last author, or both. Such authors may be emphasized because it is well known to those in the field that the first author is generally the most senior scientist performing the research and the last author is the most senior scientist overseeing/funding the research. Coauthors listed between the first and last author may contribute to the research, experiments, and resulting data; however, they may not be the authority or expert of the research area or the data when compared to the first or last author. For this reason, the system may be configured to filter connections to just the first and last author when utilizing published data for a determined connection.

Next, the process may utilize the publication, ID and/or experiment metadata to extract information about the identified scientists or organizations, including contact information 908. Next, the process may generate a list of collaborators ranked based on their correlation value, along with their contact information. In a preferred embodiment, the process may generate a collaboration graph based on the one or more identified scientists or organizations 910. The collaboration graph is described in detail below, see FIG. 10. Next, the process may send a notification 912, based on privacy settings, to the two or more identified users or organizations.

In an example embodiment, a user may provide the system 100 with a biological dataset to determine with whom he/she should collaborate with. The system 100 then uses one or more statistical approaches, described in detail above, to quantify the strength of overlap between the query biological dataset and each biological dataset within the system. Overlaps that exceed a given threshold are ranked and used to generate a collaboration graph that is weighted to visually represent the strength of the overlap. The user may configure one or more thresholds or criteria before, during, or after processing.

Figure 10:
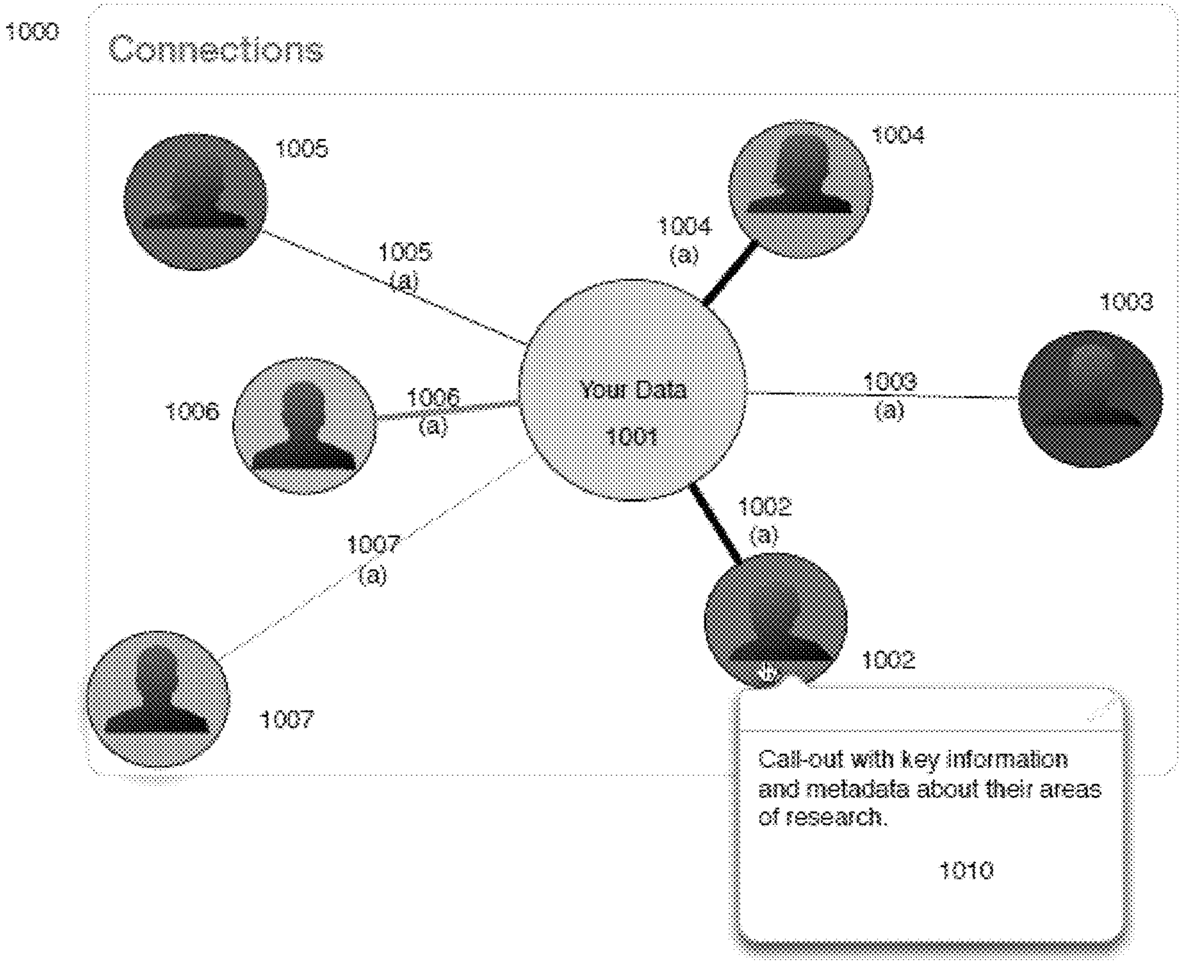
FIG. 10 is a block diagram illustrating one embodiment of a collaboration graph.

FIG. 10 is an illustration of one embodiment of a collaboration graph 1000. The collaboration graph may be dynamically generated by the system 100 based on one or more correlations and the strength of their respective overlaps. The collaboration graph 1000 may be shown via the display and reporting component. In some embodiments, a number of connections may be represented via the circle images 1002-1007. It is understood that the collaboration graph 1000 may display any number of potential collaborators based on any number of correlations.

The potential collaborations illustrated in a connection graph may be weighted based on one or more criteria using on one or more visual techniques. Visual techniques may include, but not be limited to varying colors, weighted lines (1002(*a*)-1007(*a*)), ordering, proximity to the visual representation of the user or organization, or other visual modification. Further, the system 100 may have specific interface for providing specific information 1010 about the connection. Proposed correlations may be further filtered or weighted in the collaboration graph 1000 based on one or more additional or supplemental criteria, described in detail below.

It is understood that any visualization technique may be employed to illustrate potential connections between users and/or organizations. For example, the system 100 may be configured to provide a list based on one or more recommended collaborators along with statistical relevance values or other correlation metrics. The information and the manner in which the information is displayed may be configurable by the user, organization, or system.

The system 100 may be configured to weight, filter or otherwise further evaluate the collaboration recommendation presented to a user or organization based on one or more supplemental criteria. Statistical weighting algorithms such as weighted least squares regression, Hanse-Hurwitz Estimator, Horvitz-Thompson Estimator, IRLS regression, or others, are well known to those in the art. Any algorithm or combination of algorithms may be applied to facilitate collaboration recommendations.

Additional criteria factored into collaboration recommendations may include, but not be limited to, experimental data, the type of research a user and/or organization is actively pursuing, the existence of pre-existing relationships, known or potential conflicts of interest between the users and/or organizations, the types and availability of funding opportunities currently available, or other factors. The type of additional criteria included, as well as the manner by which it is combined to prioritize collaboration recommendations, may be provided by the system 100, a user, or an organization.

As discussed above, the system 100 may receive biological datasets in either a continuous manner (connected directly to a data acquisition instrument or system) or discontinuously via upload from a user and/or organization. Each time a new biological dataset is analyzed it may generate new connections, which may in turn, update pre-existing collaboration graphs and provide each user with a dynamic representation of connectivity based on the most up-to-date data available in the system 100.

Figure 11:
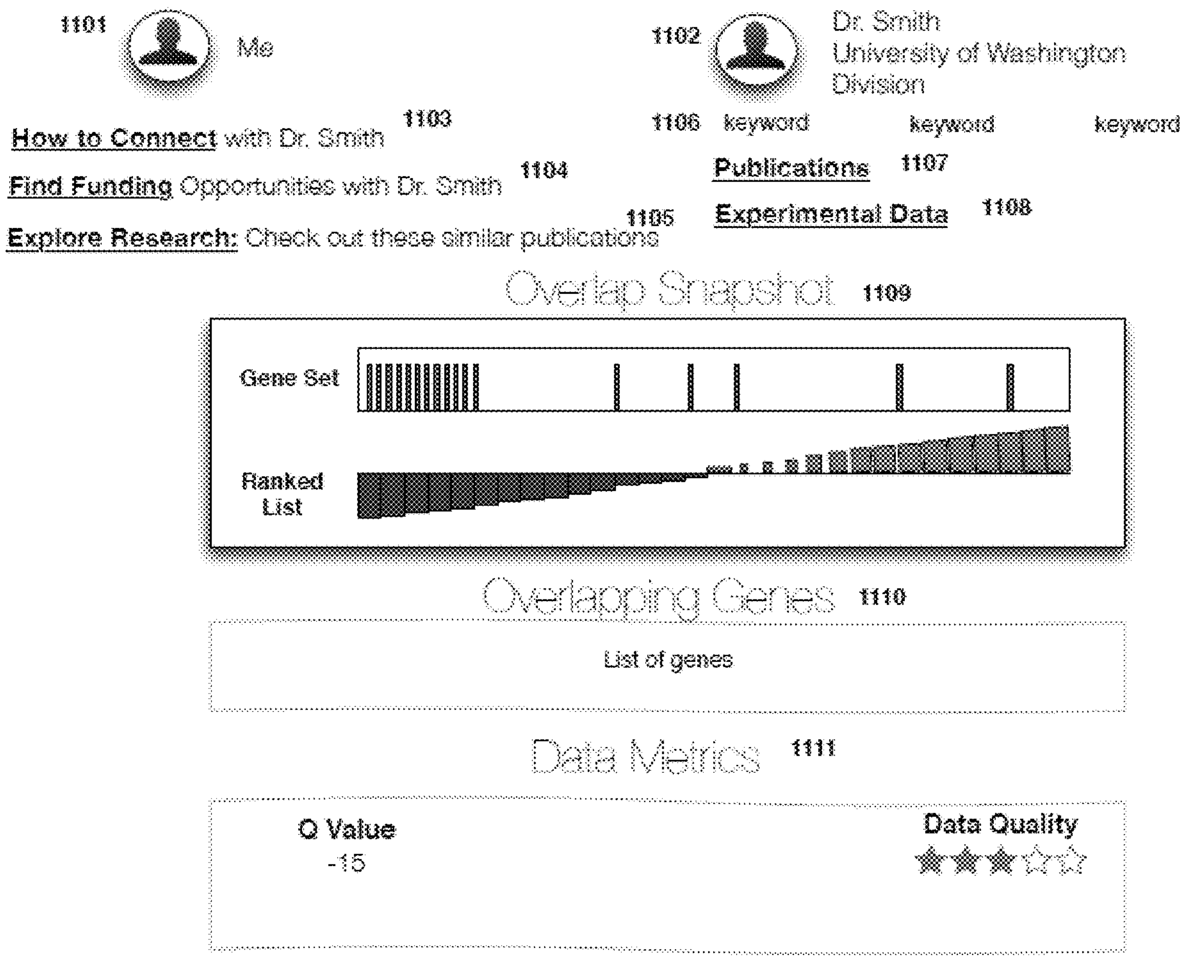
FIG. 11 is a block diagram illustrating one embodiment of a collaboration report.

FIG. 11 is an illustration of one embodiment of a collaboration report. A collaboration report may include any number of individual users or organizations as determined by any number of correlations.

The collaboration report may include information based on a user or organization 1101 and 1102, which includes but is not limited to keywords associated with their specific research areas 1106, publications 1108, a link to their professional biographies on external sites (i.e. faculty web page), or any other metadata.

A collaboration report may also include information associated with the biological datasets that formed the basis for the collaboration recommendation 1109. Examples of such information include but are not limited to a list of the overlapping genes between two biological datasets 1110, one or more metrics reporting the strength of the overlap and data quality 1111, or any other information.

A collaboration report may also include information associated with how to connect 1103, funding opportunities 1104 and recommend products and/or services, or additional research or follow-up experiments.

A collaboration report may convey the information described above in any visual format. The information included may be configured by the system 100, a user, or an organization.

Data Privacy

Biological datasets provided to the system 100 may be published, unpublished (private), or proprietary (within an organization). When one or more private biological datasets overlaps with one or more public biological datasets or another private biological dataset, the system 100 may be configured to notify each user or organization of a potential collaborator. However, the collaboration report or notification may conceal one or more specific details associated with the private biological dataset. Similar restrictions may not be implemented on information relating to public biological datasets, regardless of whether it mapped to a public or private biological dataset.

Private Collaboration Graphs

In some embodiments, the system 100 may be configured to restrict one or more collaboration recommendations to one or more specific organizations. For example, the creation of collaboration graphs specific for use within a university or pharmaceutical company. In such scenarios, the system 100 may be configured to show the most statistically relevant collaborators within one or more select organizations, regardless of the presence of stronger potential collaborators at external organizations. In a further example, collaboration graphs may be generated between two specific organizations that have a pre-existing relationship or wish to engage in a new relationship.

In some instances, the system 100 may report numerous connections, but may visually alter the connections to emphasize a particular relationship as indicated by the preference of the user or organization. Even further, the system 100 may provide information for how to create a connection (i.e. working relationship) with one or more users or organizations where no pre-existing relationship exists.

Multi-Disciplinary Collaborations and Teams

In some embodiments, the system 100 may be configured to emphasize significant correlations between users and/or organizations that, based on their data and/or associated metadata, are engaged in distinct areas of research. Such "multi-disciplinary" collaboration recommendations may be advantageous in that they provide distinct biological insights that may be required to redefine problems outside of normal boundaries and reach solutions based on a new understanding of complex situations. We refer to scenarios where more than two users and/or organization form such a team with separate expertise but correlating biological datasets as a "multi-disciplinary team".

The system 100 may be further configured to take into account multi-disciplinary collaboration requirements or teams when making recommendations in collaboration graphs or reports. For example, but not limited to, a scenario where a pharmaceutical company places a high priority on obtaining diverse expertise to facilitate drug development. In this scenario, the system 100 may be configured to show the most statistically relevant multidisciplinary team members (users), regardless of the presence of stronger matches with individual users.

Secondary Connection Analysis

In some embodiments of the system 100, the collaboration analysis may evaluate the secondary connections of one or more correlated biological datasets. The evaluation of secondary connections may determine the potential collaborations presented, collaboration recommendations, or even what potential collaborations should be filtered out from the collaboration graph. The secondary analysis may take into account the number and strength of secondary or tertiary connections with a correlated biological dataset. The number of connections to take into account—secondary, tertiary or more—may be set by a user, organization or system 100.

In summary, the details in this disclosure describe a system for determining potential collaborations based on correlations in biological datasets.

Because other modifications and changes varied to fit particular operating requirements and environments will be apparent to those skilled in the art, the invention is not considered limited to the examples chosen for purposes of disclosure, and covers changes and modifications which do not constitute departures from the true spirit and scope of this invention.

The invention claimed is:

1. A computer-implemented method for providing one or more collaboration recommendations based on correlations between experimental biological datasets the computer-implemented method comprising:

receiving a first experimental biological dataset, the first experimental biological dataset representing molecular information for a first plurality of test subjects, the first experimental biological dataset being associated with a first researcher wherein the first researcher is not one of the test subjects in the first plurality of test subjects;

statistically analyzing the first experimental biological dataset to produce a statistical analysis output;

performing correlation analysis of the statistical analysis output in order to determine one or more correlations between the first experimental biological dataset and a second experimental biological dataset, the second experimental biological dataset representing molecular information for a second plurality of test subjects, the second experimental biological dataset being associated with a research entity;

using the one or more correlations to quantify a degree of correlation between the first experimental biological dataset and the second experimental biological dataset; and in response to determining that the degree of correlation between the first experimental biological dataset and the second experimental biological dataset satisfies a threshold criteria, providing a recommendation for future research collaboration related to the first experimental biological dataset or the second experimental biological dataset to the first researcher.

2. The computer-implemented method of claim 1, further comprising:

prior to statistically analyzing the first experimental biological dataset to produce the statistical analysis output, normalizing the first experimental biological dataset.

3. The computer-implemented method of claim 1, wherein using the one or more correlations quantify a degree of correlation between the first experimental biological dataset and the second experimental biological dataset further includes using a metric that estimates strength of association to quantify the degree of correlation between the first experimental biological dataset and the second experimental biological dataset.

4. The computer-implemented method of claim 1, further comprising:

determining one or more additional correlations between the first experimental biological dataset and one or more additional experimental biological datasets;

utilizing the one or more correlations between the first experimental biological dataset and the second experimental biological dataset and the one or more additional correlations between the first experimental biological dataset and one or more additional experimental biological datasets to generate a collaboration graph, wherein the collaboration graph displays one or more recommendations for life science research collaboration between the first researcher and one or more additional research entities.

5. The computer-implemented method of claim 1, wherein determining one or more correlations between the first experimental biological dataset and the second experimental biological dataset includes identifying a molecule that is identified in the first experimental biological dataset and determining that the molecule is identified in the second experimental biological dataset.

6. The computer-implemented method of claim 1, wherein the first experimental biological dataset relates to a first differentially expressed or modified molecule and wherein determining one or more correlations between the first experimental biological dataset and the second experimental biological dataset includes identifying determining that the second experimental biological dataset relates to the first differentially expressed or modified molecule.

7. The computer-implemented method of claim 1, wherein the first experimental biological dataset is a ranked list of molecules ordered according to a statistical or quantity metric representing differential expression or modification between two biological states.

8. The computer-implemented method of claim 7, further comprising:

applying a significance threshold to the top and bottom of the ranked list of molecules to identify sets of molecules that are up-regulated and sets of molecules that are down-regulated.

9. The computer-implemented method of claim 1, wherein determining one or more correlations between the first experimental biological dataset and the second experimental biological dataset includes comparing differentially expressed sets of molecules identified by the first experimental biological dataset to differentially expressed sets of molecules identified by the second experimental biological dataset.

10. A system comprising one or more networked computing devices, the one or more networked computing devices comprising:

one or more processors;

one or more memories; and a collaboration recommendations system stored in one or more memories and executable by one or more processors, wherein the collaboration recommendations system is configured to:

receive a first experimental biological dataset, the first experimental biological dataset representing molecular information for a first plurality of test subjects, the first experimental biological dataset being associated with a first researcher wherein the first researcher is not one of the test subjects in the first plurality of test subjects;

statistically analyze the first experimental biological dataset to produce a statistical analysis output;

perform correlation analysis of the statistical analysis output in order to determine one or more correlations between the first experimental biological dataset and a second experimental biological dataset, the second experimental biological dataset representing molecular information for a second plurality of test subjects, the second experimental biological dataset being associated with a research entity;

use the one or more correlations to quantify a degree of correlation between the first experimental biological dataset and the second experimental biological dataset; and in response to determining that the degree of correlation between the first experimental biological dataset and the second experimental biological dataset satisfies a threshold criteria, providing a recommendation for future research collaboration related to the first experimental biological dataset or the second experimental biological dataset to the first researcher.

11. The system of claim 10, wherein the collaboration recommendations system is further configured to:

prior to statistically analyzing the first experimental biological dataset to produce the statistical analysis output, normalize the first experimental biological dataset.

12. The system of claim 10, wherein using the one or more correlations quantify a degree of correlation between the first experimental biological dataset and the second experimental biological dataset further includes using a metric that estimates strength of association to quantify the degree of correlation between the first experimental biological dataset and the second experimental biological dataset.

13. The system of claim 10, wherein the collaboration recommendations system is further configured to:

determine one or more additional correlations between the first experimental biological dataset and one or more additional experimental biological datasets;

utilize the one or more correlations between the first experimental biological dataset and the second experimental biological dataset and the one or more additional correlations between the first experimental biological dataset and one or more additional experimental biological datasets to generate a collaboration graph, wherein the collaboration graph displays one or more recommendations for life science research collaboration between the first researcher and one or more additional research entities.

14. The system of claim 10, wherein determining one or more correlations between the first experimental biological dataset and the second experimental biological dataset includes identifying a molecule that is identified in the first experimental biological dataset and determining that the molecule is identified in the second experimental biological dataset.

15. The system of claim 10, wherein the first experimental biological dataset relates to a first differentially expressed or modified molecule and wherein determining one or more correlations between the first experimental biological dataset and the second experimental biological dataset includes identifying determining that the second experimental biological dataset relates to the first differentially expressed or modified molecule.

16. The system of claim 10, wherein the first experimental biological dataset is a ranked list of molecules ordered according to a statistical or quantity metric representing differential expression or modification between two biological states.

17. The system of claim 16, wherein the collaboration recommendations system is further configured to:

apply a significance threshold to the top and bottom of the ranked list of molecules to identify sets of molecules that are up-regulated and sets of molecules that are down-regulated.

18. The system of claim 10, wherein determining one or more correlations between the first experimental biological dataset and the second experimental biological dataset includes comparing differentially expressed sets of molecules identified by the first experimental biological dataset to differentially expressed sets of molecules identified by the second experimental biological dataset.

* * * * *